United States Patent [19]

Eryurek

[11] Patent Number: 6,047,220

[45] Date of Patent: Apr. 4, 2000

[54] DEVICE IN A PROCESS SYSTEM FOR VALIDATING A CONTROL SIGNAL FROM A FIELD DEVICE

[75] Inventor: Evren Eryurek, Minneapolis, Minn.

[73] Assignee: Rosemount Inc., Eden Prairie, Minn.

[21] Appl. No.: 08/998,906

[22] Filed: Dec. 29, 1997

Related U.S. Application Data

[60] Provisional application No. 60/034,125, Dec. 31, 1996.

[51] Int. Cl.[7] .................................................. G05B 13/02
[52] U.S. Cl. ................................ 700/28; 700/10; 700/12; 700/29; 700/33; 700/271; 700/287; 702/183; 706/23
[58] Field of Search .............................. 700/10, 12, 271, 700/287, 28, 33, 29

[56] References Cited

U.S. PATENT DOCUMENTS

| Re. 29,383 | 9/1977 | Gallatin et al. ............................ 137/14 |
|---|---|---|
| 3,096,434 | 7/1963 | King ......................................... 702/46 |
| 3,404,264 | 10/1968 | Kugler .................................... 235/194 |
| 3,701,280 | 10/1972 | Stroman ............................... 73/186.02 |
| 4,058,975 | 11/1977 | Gilbert et al. .......................... 60/39.28 |
| 4,099,413 | 7/1978 | Ohte et al. ............................... 734/175 |
| 4,337,516 | 6/1982 | Murphy et al. ......................... 702/183 |
| 4,517,468 | 5/1985 | Kemper et al. ........................... 290/52 |

(List continued on next page.)

FOREIGN PATENT DOCUMENTS

| 0 122 622 A1 | 10/1984 | European Pat. Off. . |
|---|---|---|
| 0 413 814 A1 | 2/1991 | European Pat. Off. . |
| 0 487 419 A2 | 5/1992 | European Pat. Off. . |
| 0 594 277 A1 | 4/1994 | European Pat. Off. . |
| 0 624 847 A1 | 11/1994 | European Pat. Off. . |
| 0 644 470 A2 | 3/1995 | European Pat. Off. . |
| 2 334 827 | 12/1975 | France . |
| 2 334 827 | 7/1977 | France . |

(List continued on next page.)

OTHER PUBLICATIONS

"Smart Temperature Measurement in the '90s", *C&I*, by T. Kerlin et al., (1990).

"Fuzzy Logic and Artificial Neural Networks for Nuclear Power Plant Applications," *Proceedings of the American Power Conference*, R.C. Berkan et al.

"Automated Generation of Nonlinear System Characterization for Sensor Failure Detection," *ISA*, by B.R. Upadhyaya et al., 1989 pp. 269–274.

"Development and Application of Neural Network Algorithms For Process Diagnostics," *Proceedings of the 29th Conference on Decision and Control*, by B.R. Upadhyaya et al., 1990, pp. 3277–3282.

"Application of Neural Networks for Sensor Validation and Plant Monitoring," *Nuclear Technology*, by B. Upadhyaya, et al., vol. 97, No. 2, Feb. 1992 pp. 170–176.

"Neural Networks for Sensor Validation and Plantwide Monitoring," by E. Eryurek, et al., vol. XII, No. 1–2, Jan./Feb. 1992.

(List continued on next page.)

*Primary Examiner*—William Grant
*Assistant Examiner*—McDieunel Marc
*Attorney, Agent, or Firm*—Westman, Champlin & Kelly, P.A.

[57] ABSTRACT

A device in a process control system includes a memory for storing a series of sensed process variables and command outputs representative of a learned process cycle. Comparison circuitry compares recent process information to learned process information stored in the memory and responsively provides a validity output signal. A method includes learning a cycle of a process to provide learned process information which comprises stored process variables and stored control signals over a time period, measuring a process variable in the process and responsively calculating the control output, storing the process variable in the control output to provide recent process information, and comparing the recent process information to the learned process information and responsively providing a validity output signal.

15 Claims, 4 Drawing Sheets

U.S. PATENT DOCUMENTS

| | | | |
|---|---|---|---|
| 4,530,234 | 7/1985 | Cullick et al. | 73/19.02 |
| 4,635,214 | 1/1987 | Kasai et al. | 702/183 |
| 4,642,782 | 2/1987 | Kemper et al. | 706/53 |
| 4,644,479 | 2/1987 | Kemper et al. | 702/185 |
| 4,649,515 | 3/1987 | Thompson et al. | 706/52 |
| 4,707,796 | 11/1987 | Calabro et al. | 702/34 |
| 4,777,585 | 10/1988 | Kokawa et al. | 706/52 |
| 4,831,564 | 5/1989 | Suga | 702/34 |
| 4,873,655 | 10/1989 | Kondraske | 702/86 |
| 4,907,167 | 3/1990 | Sheirik | 700/10 |
| 4,924,418 | 5/1990 | Bachman et al. | 702/188 |
| 4,934,196 | 6/1990 | Romano | 73/861.356 |
| 4,964,125 | 10/1990 | Kim | 714/26 |
| 4,992,965 | 2/1991 | Hölter et al. | 701/36 |
| 5,005,142 | 4/1991 | Lipchak et al. | 702/183 |
| 5,032,525 | 7/1991 | Lee et al. | 436/55 |
| 5,043,862 | 8/1991 | Takahashi et al. | 700/142 |
| 5,053,815 | 10/1991 | Wendell | 399/10 |
| 5,081,598 | 1/1992 | Bellows et al. | 702/184 |
| 5,089,984 | 2/1992 | Struger et al. | 700/12 |
| 5,098,197 | 3/1992 | Shepard et al. | 374/120 |
| 5,099,436 | 3/1992 | McCown et al. | 702/82 |
| 5,103,409 | 4/1992 | Shimizu et al. | 702/183 |
| 5,111,531 | 5/1992 | Grayson et al. | 706/23 |
| 5,121,467 | 6/1992 | Skeirik | 706/10 |
| 5,122,976 | 6/1992 | Bellows et al. | 702/185 |
| 5,130,936 | 7/1992 | Sheppard et al. | 702/123 |
| 5,134,574 | 7/1992 | Beaverstock et al. | 702/84 |
| 5,142,612 | 8/1992 | Skeirik | 706/23 |
| 5,148,378 | 9/1992 | Shibayama et al. | 702/116 |
| 5,167,009 | 11/1992 | Sheirik | 706/23 |
| 5,175,678 | 12/1992 | Frerichs et al. | 700/47 |
| 5,193,143 | 3/1993 | Kaemmerer et al. | 385/105 |
| 5,197,114 | 3/1993 | Skeirik | 700/116 |
| 5,197,328 | 3/1993 | Fitzgerald | 73/168 |
| 5,212,765 | 5/1993 | Skeirik | 417/44.2 |
| 5,214,582 | 5/1993 | Gray | 701/33 |
| 5,224,203 | 6/1993 | Skeirik | 706/23 |
| 5,228,780 | 7/1993 | Shepard et al. | 374/175 |
| 5,235,527 | 8/1993 | Ogawa et al. | 702/116 |
| 5,265,031 | 11/1993 | Malczewski | 702/24 |
| 5,265,222 | 11/1993 | Nishiya et al. | 706/10 |
| 5,274,572 | 12/1993 | O'Neill et al. | 702/57 |
| 5,282,131 | 1/1994 | Rudd et al. | 313/578 |
| 5,282,261 | 1/1994 | Skeirik | 706/23 |
| 5,293,585 | 3/1994 | Morita | 702/24 |
| 5,303,181 | 4/1994 | Stockton | 369/84 |
| 5,305,230 | 4/1994 | Matsumoto et al. | 700/287 |
| 5,311,421 | 5/1994 | Nomura et al. | 700/37 |
| 5,317,520 | 5/1994 | Castle | 702/58 |
| 5,327,357 | 7/1994 | Feinstein et al. | 700/271 |
| 5,333,240 | 7/1994 | Matsumoto et al. | 395/23 |
| 5,349,541 | 9/1994 | Alexandro, Jr. et al. | 700/271 |
| 5,357,449 | 10/1994 | Oh | 702/188 |
| 5,361,628 | 11/1994 | Marko et al. | 73/116 |
| 5,365,423 | 11/1994 | Chand | 700/12 |
| 5,367,612 | 11/1994 | Bozich et al. | 706/23 |
| 5,384,699 | 1/1995 | Levy et al. | 250/363.03 |
| 5,386,373 | 1/1995 | Keeler et al. | 700/266 |
| 5,394,341 | 2/1995 | Kepner | 702/183 |
| 5,394,543 | 2/1995 | Hill et al. | 714/26 |
| 5,404,064 | 4/1995 | Mermelstein et al. | 310/319 |
| 5,408,406 | 4/1995 | Mathur et al. | 700/45 |
| 5,408,586 | 4/1995 | Skeirik et al. | 706/25 |
| 5,414,645 | 5/1995 | Hirano | 702/185 |
| 5,419,197 | 5/1995 | Ogi et al. | 73/659 |
| 5,430,642 | 7/1995 | Nakajima et al. | 700/50 |
| 5,440,478 | 8/1995 | Fisher et al. | 700/109 |
| 5,467,355 | 11/1995 | Umeda et al. | 702/184 |
| 5,469,735 | 11/1995 | Watanabe | 73/118.1 |
| 5,483,387 | 1/1996 | Bauhahn et al. | 359/885 |
| 5,485,753 | 1/1996 | Burns et al. | 73/720 |
| 5,486,996 | 1/1996 | Samad et al. | 700/32 |
| 5,488,697 | 1/1996 | Kaemmerer et al. | 706/46 |
| 5,489,831 | 2/1996 | Harris | 318/701 |
| 5,511,004 | 4/1996 | Dubost et al. | 702/183 |
| 5,548,528 | 8/1996 | Keeler et al. | 702/22 |
| 5,561,599 | 10/1996 | Lu | 700/44 |
| 5,570,300 | 10/1996 | Henry et al. | 702/45 |
| 5,572,420 | 11/1996 | Lu | 700/33 |
| 5,598,521 | 1/1997 | Kilgore et al. | 345/326 |
| 5,600,148 | 2/1997 | Cole et al. | 250/495.1 |
| 5,640,491 | 6/1997 | Bhat et al. | 706/25 |
| 5,671,335 | 9/1997 | Davis et al. | 706/25 |
| 5,672,975 | 9/1997 | Kielb et al. | 342/644 |
| 5,675,504 | 10/1997 | Serodes et al. | 702/25 |
| 5,704,011 | 12/1997 | Hansen et al. | 706/25 |
| 5,778,151 | 7/1998 | Gramckow et al. | 706/20 |
| 5,781,878 | 7/1998 | Mizoguchi et al. | 701/109 |
| 5,821,498 | 10/1998 | Niskamen et al. | 219/469 |
| 5,924,086 | 7/1999 | Mathur et al. | 706/25 |

FOREIGN PATENT DOCUMENTS

| | | |
|---|---|---|
| 35 40 204 C1 | 9/1986 | Germany. |
| 40 08 560 A1 | 9/1990 | Germany. |
| 44 33 593 A1 | 6/1995 | Germany. |
| 195 02 499 A1 | 8/1996 | Germany. |
| 58-129316 | 8/1983 | Japan. |
| 59-116811 | 7/1984 | Japan. |
| 59-211196 | 11/1984 | Japan. |
| 59-211896 | 11/1984 | Japan. |
| 60-507 | 1/1985 | Japan. |
| 60-76619 | 5/1985 | Japan. |
| 60-131495 | 7/1985 | Japan. |
| 62-30915 | 2/1987 | Japan. |
| 64-001914 | 1/1989 | Japan. |
| 64-1914 | 1/1989 | Japan. |
| 64-72699 | 3/1989 | Japan. |
| 2-5105 | 1/1990 | Japan. |
| 5-122768 | 5/1993 | Japan. |
| 6-19729 | 3/1994 | Japan. |
| 6-242192 | 9/1994 | Japan. |
| 7-63586 | 3/1995 | Japan. |
| 7-234988 | 9/1995 | Japan. |
| 8-54923 | 2/1996 | Japan. |
| 8-136386 | 5/1996 | Japan. |
| 8-166309 | 6/1996 | Japan. |
| 928704 | 6/1963 | United Kingdom. |
| WO 94/25933 | 11/1994 | WIPO. |
| WO 97/21157 | 6/1997 | WIPO. |

OTHER PUBLICATIONS

"Neural Networks for Sensor Validation and Plant Monitoring," *International Fast Reactor Safety Meeting*, by B. Upadhyaya, et al., Aug. 12–16, 1990, pp. 2–10.

"Integration of Multiple Signal Validation Modules for Sensor Monitoring," *Department of Nuclear Engineering*, by B. Upadhyaya et al. Jul. 8, 1990 pp. 1–6.

"Sensor Validation for Power Plants Using Adaptive Back-propagation Neural Network," *IEEE Transactions on Nuclear Science*, vol. 37, No. 2, by E. Eryurek et al. Apr. 1990, pp. 1040–1047.

"Application of Neural Computing Paradigms for Signal Validation," *Department of Nuclear Engineering*, by B.R. Upadhyaya, E. Eryurek and G. Mathai, pp. 1–18.

"Using Artificial Neural Networks to Identify Nuclear Power Plant States," by Israel E. Alguindigue et al., pp. 1–4.

"An Integrated Architecture For Signal Validation in Power Plants," *Third IEEE International Symposium on Intelligent Control*, by B.R. Upadhyaya et al., Aug. 24–26, 1988, pp. 1–6.

"A Decade of Progress in High Temperature Johnson Noise Thermometry," *American Institute of Physics*, by T.V. Blalock and R.L. Shepard, 1982 pp. 1219–1223.

"Application of Johnson Noise Thermometry to Space Nuclear Reactors," *Presented at the 6th Symposium on Space Nuclear Power Systems*, by M.J. Roberts, T.V. Blalock and R.L. Shepard, Jan. 9–12, 1989.

"Software–Based Fault–Tolerant Control Design for Improved Power Plant Operation," *IEEE/IFAC Joint Symposium on Computer–Aided Control System Design*, Mar. 7–9, 1994 pp. 585–590.

"In Situ Calibration of Nuclear Plant Platinum Resistance Thermometers Using Johnson Noise Methods," *EPRI*, Jun. 1983.

"Johnson Noise Power Thermometer and its Application in Process Temperature Measurement," *American Institute of Physics* by T.V. Blalock et al., 1982, pp. 1249–1259.

"Johnson Noise Thermometer for High–Radiation and High–Temperature Environments," *Fifth Symposium on Space Nuclear Power Systems*, by L. Oakes et al., Jan. 1988, pp. 2–23.

"Noise Thermometry for Industrial and Metrological Applications at KFA Jülich," *7th International Symposium on Temperature*, by H. Brixy et al. 1992.

Parallel, Fault–Tolerant Control and Diagnostics System for Feedwater Regulation in PWRS, *Proceedings of the American Power Conference*, by E. Eryurek et al.

"Survey, Applications, And Prospects of Johnson Noise Thermometry," *Electrical Engineering Department*, by T. Blalock et al. 1981 pp. 2–11.

"Tuned–Circuit Dual–Mode Johnson Noise Thermometers," by R.L. Shepard, 1992.

"Using Artificial Neural Networks to Identify Nuclear Power Plant States," by Israel E. Alguindigue et al., pp. 1–4.

"Development of a Long–Life, High–Reliability Remotely Operated Johnson Noise Thermometer," *ISA*, by R.L. Shepard et al., 1991, pp. 77–84.

"Tuned–Circuit Johnson Noise Thermometry," *7th Symposium on Space Nuclear Power Systems*, by Michael Roberts et al., Jan. 1990.

"Wavelet Analysis of Vibration, Part 1: Theory[1],"*Journal of Vibration and Acoustics*, by D.E. Newland, vol. 116, Oct. 1994, pp. 409–416.

"Wavelet Analysis of Virbration, Part 2: Wavelet Maps," *Journal of Vibration and Acoustics*, by D.E. Newland, vol. 116, Oct. 1994, pp. 417–425.

"Signal Processing, Data Handling and Communications: The Case for Measurement Validation", by M.P. Henry, Department of Engineering Science, Oxford University.

A Standard Interface for Self–Validating Sensors, *Report No. QUEL 1884/91*, by M.P. Henry et al., (1991).

"The Implications of Digital Communucations on Sensor Validation", *Report No. QUEL 1912/92*, by M. Henry et al., (1992).

"A Fault–Tolerant Interface for Self–Validating Sensors", *IEE Colloquium*, by M.P. Henry, pp. 3/1/–3/2, Digest No. 1990/145.

"In–Situ Response Time Testing of Thermocouples", *ISA*, by H.M. Hashemian et al., Paper No. 89–0056, pp. 587–593, (1989).

"Field–Based Architecture is Based on Open Systems, Improves Plant Performance", *I&CS*, by Peter Cleaveland, Aug. 1996, pp. 73–74.

"Sensor and Device Diagnostics for Predictive and Proactive Maintenance", *A Paper Presented at the Electric Power Research Institute—Fossil Plant Maintenance Conference*, by B. Boynton, Jul. 29–Aug. 1, 1996, pp. 50–1—50–6.

"Keynote Paper: Hardware Compilation–A New Technique for Rapid Prototyping of Digital Systems–Applied to Sensor Validation", *Control Eng. Practice*, by M.P. Henry, vol. 3, No. 7., pp. 907–924, (1995).

"Programmable Hardware Architectures for Sensor Validation", *Control Eng. Practice*, by M.P. Henry et al., vol. 4, No. 10., pp. 1339–1354, (1996).

"Intelligent Behaviour for Self–Validating Sensors", *Advances In Measurement*, by M.P. Henry, pp. 1–7, (May 1990).

"Check of Semiconductor Thermal Resistance Elements by the Method of Noise Thermometry," by A. Kisilevskii et al., *Measurement Techniques*, vol. 25, No. 3, (1982) pp. 244–246.

"Measurement of the Temperature Fluctuation in a Resistor Generating $I/f$ Fluctuation," by S. Hashiguchi, *Japanese Journal of Applied Physics*, vol. 22, No. 5, Part 2, (1983).

"A New Method of Johnson Noise Thermometry*," by C.J. Borkowski et al., *Review of Scientific Instruments*, vol. 45, No. 2, Feb. 1974, pp. 151–162.

"Detection of Hot Spots in Thin Metal Films Using an Ultra Sensitive Dual Channel Noise Measurement Systems," by G.H. Massiha et al., *Energy and Information Technologies in the Southeast, Columbia*, vol. 3 of 3, Apr. 1989, pp. 1310–1314.

"Smart Field Devices Provide New Process Data, Increase System Flexibility," *I&CS*, by Mark Boland, Nov. 1994, pp. 45–51.

"Development of a Resistance Thermometer For Use Up to 1600°C", by M.J. de Groot and J.F. Dubbeldam, *CAL LAB*, Jul./Aug. 1996, pp. 38–41.

"Detecting Blockage in Process Connections of Differential Pressure Transmitters," by E. Taya et al., *SICE*, (1995), pp. 1605–1608.

"Fuzzy Logic and Neural Network Applications to Fault Diagnosis," by P. Frank et al., *International Journal of Approximate Reasoning*, 1997.

"Taking Full Advantage of Smart Transmitter Technology Now," by G. Orrison, *Control Engineering*, vol. 42, No. 1, Jan. 1995.

"On–Line Statistical Process Control for a Glass Tank Ingredient Scale," by R.A. Weisman, *IFAC real Time Programming*, 1985, pp. 29–38.

"The Performance of Control Charts for Monitoring Process Variation," by C. Lowry et al., *Commun. Statis.—Simula.*, 1995, pp. 409–437.

"A Knowledge–Based Approach for Detection and Diagnosis of Out–Of–Control Events in Manufacturing Processes," by P. Love et al., *IEEE*, 1989, pp. 736–741.

DEVICE IN A PROCESS SYSTEM FOR VALIDATING A CONTROL SIGNAL FROM A FIELD DEVICE

This application is based on Provisional Application Ser. No. 60/034,125, filed on Dec. 31, 1996 and entitled "ON-LINE COMMAND VALIDATION".

BACKGROUND OF THE INVENTION

The present invention relates to devices which couple to process control loops of the type used in industry. More specifically, the invention relates to validating a control signal from a field device.

Process control loops are used in industry to control operation of a process, such as an oil refinery. A transmitter is typically part of the loop and is located in the field to measure and transmit a process variable such as pressure, flow or temperature, for example, to control room equipment. A controller such as a valve controller is also part of the process control loop and controls position of a valve based upon a control signal received over the control loop or generated internally. Other controllers control electric motors or solenoids, for example. The control room equipment is also part of the process control loop such that an operator or computer in the control room is capable of monitoring the process based upon process variables received from transmitters in the field and responsively controlling the process by sending control signals to the appropriate control devices. Another process device, which may be part of a control loop, is a portable communicator which is capable of monitoring and transmitting process signals on the process control loop. These are often used to configure devices which form the loop.

It is desirable to validate the control signals in the process control system thereby improving the reliability of the entire loop. Typically, the prior art has been limited to simple validation techniques, such as monitoring a control signal and sounding an alarm or providing a safety shutdown if the control signal exceeds predefined limits. Another prior art technique is to generate a redundant control signal using the same or a different control algorithm and compare the two control signals. The control signal is invalidated if it differs from the redundant signal.

SUMMARY OF THE INVENTION

A device in a process control system includes a memory for storing a series of sensed process variables and command outputs representative of a learned process cycle. Comparison circuitry compares recent process information to learned process information stored in the memory and responsively provides a validity output signal. A method in accordance with one aspect of the invention includes learning a cycle of a process to provide learned process information which comprises stored process variables and stored control signals over a time period, measuring a process variable in the process and responsively calculating the control output, storing the process variable in the control output to provide recent process information, and comparing the recent process information to the learned process information and responsively providing a validity output signal.

DETAILED DESCRIPTION OF THE PREFERRED EMBODIMENTS

The present invention provides a technique for validating control signals in a process control system to control process variables. Process variables are typically the primary variables which are being controlled in a process. As used herein, process variable means any variable which describes the condition of the process such as, for example, pressure, flow, temperature, product level. pH, turbidity, vibration, position, motor current, any other characteristic of the process, etc. Control signal means any signal (other than a process variable) which is used to control the process. For example, control signal means a desired process variable value (i.e. a setpoint) such as a desired temperature, pressure, flow, product level, pH or turbidity, etc., which is adjusted by a controller or used to control the process. Additionally, a control signal means, calibration values, alarms, alarm conditions, the signal which is provided to a control element such as a valve position signal which is provided to a valve actuator, an energy level which is provided to a heating element, a solenoid on/off signal, etc., or any other signal which relates to control of the process. Process devices include any device which forms part of or couples to a process control loop and is used in the control or monitoring of a process.

Figure 1:
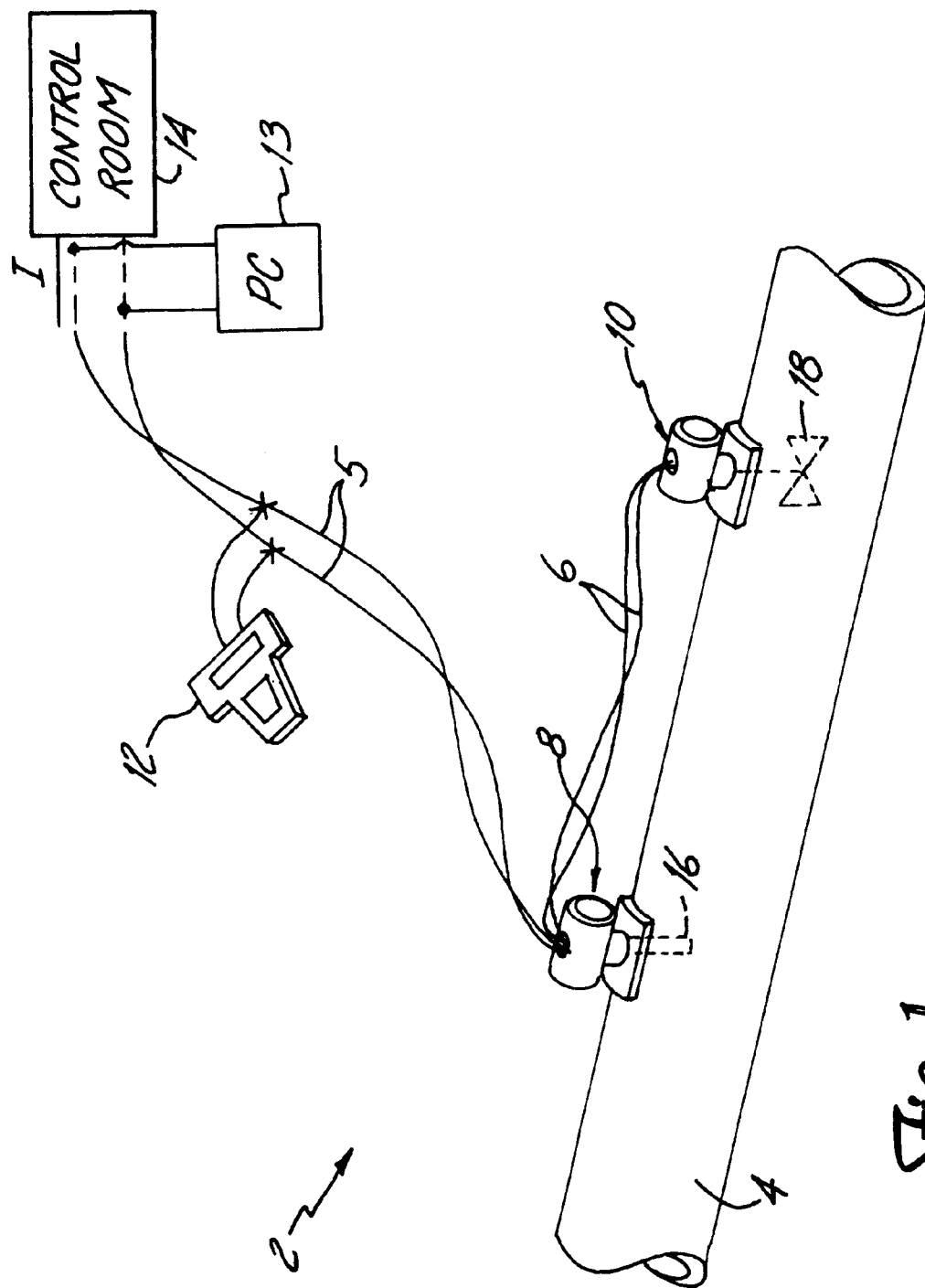
FIG. 1 is a simplified diagram showing a process control loop including a transmitter, controller, hand-held communicator and control room.

FIG. 1 is a diagram showing an example of a process control system 2 which includes process piping 4 carrying a process fluid and two wire process control loop 6 carrying loop current I. Transmitter 8, controller 10 (which couples to a final control element in the loop such as an actuator, valve, a pump, motor or solenoid), communicator 12, pc 13 and control room 14 are all part of process control loop 6. It is understood that loop 6 is shown in one configuration and any appropriate process control loop may be used such as a 4–20 mA loop, 2, 3 or 4 wire loop, multi-drop loop and a loop operating in accordance with the HART®, Fieldbus or other digital or analog communication protocol. In operation, transmitter 8 senses a process variable such as flow using sensor 16 and transmits the sensed process variable over loop 6. The process variable may be received by controller/valve actuator 10, communicator 12, pc 13 and/or control room equipment 14. Controller 10 is shown coupled to valve 18, and is capable of controlling the process by adjusting valve 18 thereby changing the flow in pipe 4. Controller 10 receives a control input over loop 6 from, for example, control room 14, transmitter 8 or communicator 12 and responsively adjusts valve 18. In another embodiment, controller 10 internally generates the control signal based upon process signals received over loop 6. Communicator 12 may be the portable communicator shown in FIG. 1 or may be a permanently mounted process unit which monitors the process and performs computations. Process devices include, for example, transmitter 8, controller 10, communicator 12 and control room 14 shown in FIG. 1. Another type of process device is a PC, programmable logic unit (PLC) or other computer coupled to the loop using appropriate I/O circuitry to allow monitoring, managing, and/or transmitting on the loop.

Figure 2:
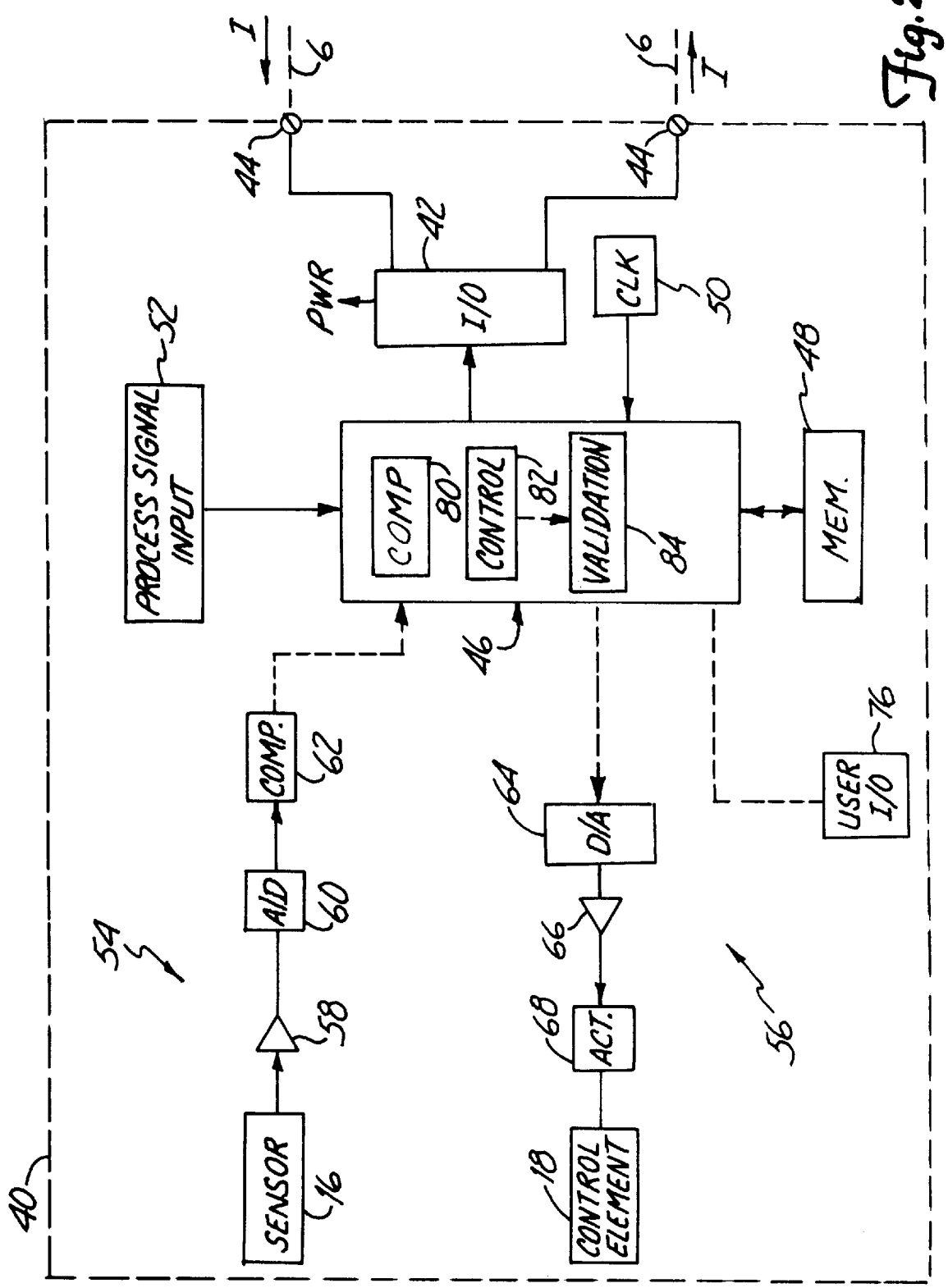
FIG. 2 is a block diagram of a process device in accordance with the present invention.

Any of the process devices 8, 10, 12, 13 or 14 shown in FIG. 1 may include control signal validation circuitry in accordance with the present invention. FIG. 2 is a block diagram of a process device 40 forming part of loop 6. Device 40 is shown generically and may comprise any of process device 8–14. In one preferred embodiment, device 40 comprises pc 13. Control room equipment 14 may comprise, for example, a DCS system implemented with a PLC and controller 10 may also comprise a "smart" motor and pump. Process device 40 includes I/O circuitry 42 coupled to loop 6 at terminals 44. I/O circuitry has preselected input and output impedances known in the art to facilitate appropriate communication from and to device 40. Device 40 includes microprocessor 46, coupled to I/O circuitry 42, memory 48 coupled to microprocessor 46 and clock 50 coupled to microprocessor 46. Microprocessor 46 receives a process signal input 52. Input 52 is intended to signify input of any process signal, and as explained above, the process signal input may be a process variable, or a control signal and may be received from loop 6 using I/O circuitry 42 or may be generated internally within field device 40. Field device 40 is shown with a sensor input channel 54 and a control channel 56. In many instances, a transmitter such as transmitter 8 will exclusively include sensor input channel 54 while a controller such as controller 10 will exclusively include a control channel 56. Other devices on loop 6 such as communicator 12 and control room equipment 14 may not include channels 54 and 56. It is understood that device 40 may contain a plurality of channels to monitor a plurality of process variables and/or control a plurality of control elements as appropriate.

Sensor input channel 54 includes sensor 16, sensing a process variable and providing a sensor output to amplifier 58 which has an output which is digitized by analog to digital converter 60. Channel 54 is typically used in transmitters such as transmitter 8. Compensation circuitry 62 compensates the digitized signal and provides a digitized process variable signal to microprocessor 46.

When process device 40 operates as a controller such as controller 8, device 40 includes control channel 56 having control element 18 such as a valve, for example. Control element 18 is coupled to microprocessor 46 through digital to analog converter 64, amplifier 66 and actuator 68. Digital to analog converter 64 digitizes a command output from microprocessor 46 which is amplified by amplifier 66. Actuator 68 controls the control element 18 based upon the output from amplifier 66. In one embodiment, actuator 68 is coupled directly to loop 6 and controls a source of pressurized air (not shown) to position control element 18 in response to the current I flowing through loop 6.

In one embodiment, I/O circuitry 42 provides a power output used to completely power all the circuitry in process device 40 using power received from loop 6. Typically, field devices such as transmitter 8, or controller 10 are powered from the loop 6 while communicator 12 or control room 14 has a separate power source. As described above, process signal input 52 provides a process signal to microprocessor 46. The process signal may be a process variable from sensor 16, the control output provided to control element 18, or a control signal, process variable or diagnostic signal received over loop 6, or a process signal received or generated by some other means such as another I/O channel.

A user I/O circuit 76 is also connected to microprocessor 46 and provides communication between device 40 and a user. User I/O circuit 76 includes, for example, a display for output and a keypad for input. Typically, communicator 12 and control room 14 includes I/O circuit 76 which allows a user to monitor and input process signals such as process variables, control signals (setpoints, calibration values, alarms, alarm conditions, etc.) A user may also use circuit 76 in communicator 12 or control room 14 to send and receive such process signals between transmitter 8 and controller 10 over loop 6. Further, such circuitry could be directly implemented in transmitter 8, controller 10 or any other process device 40.

Microprocessor 46 acts in accordance with instructions stored in memory 48 and provides, in some embodiments, a sensor compensation function 80 and/or a control function 82. Furthermore, microprocessor 46 provides a control signal validation function 84 in accordance with the present invention. The command signal to be validated may be received, for example, through any of the various inputs to microprocessor 46 described above.

Figure 3:
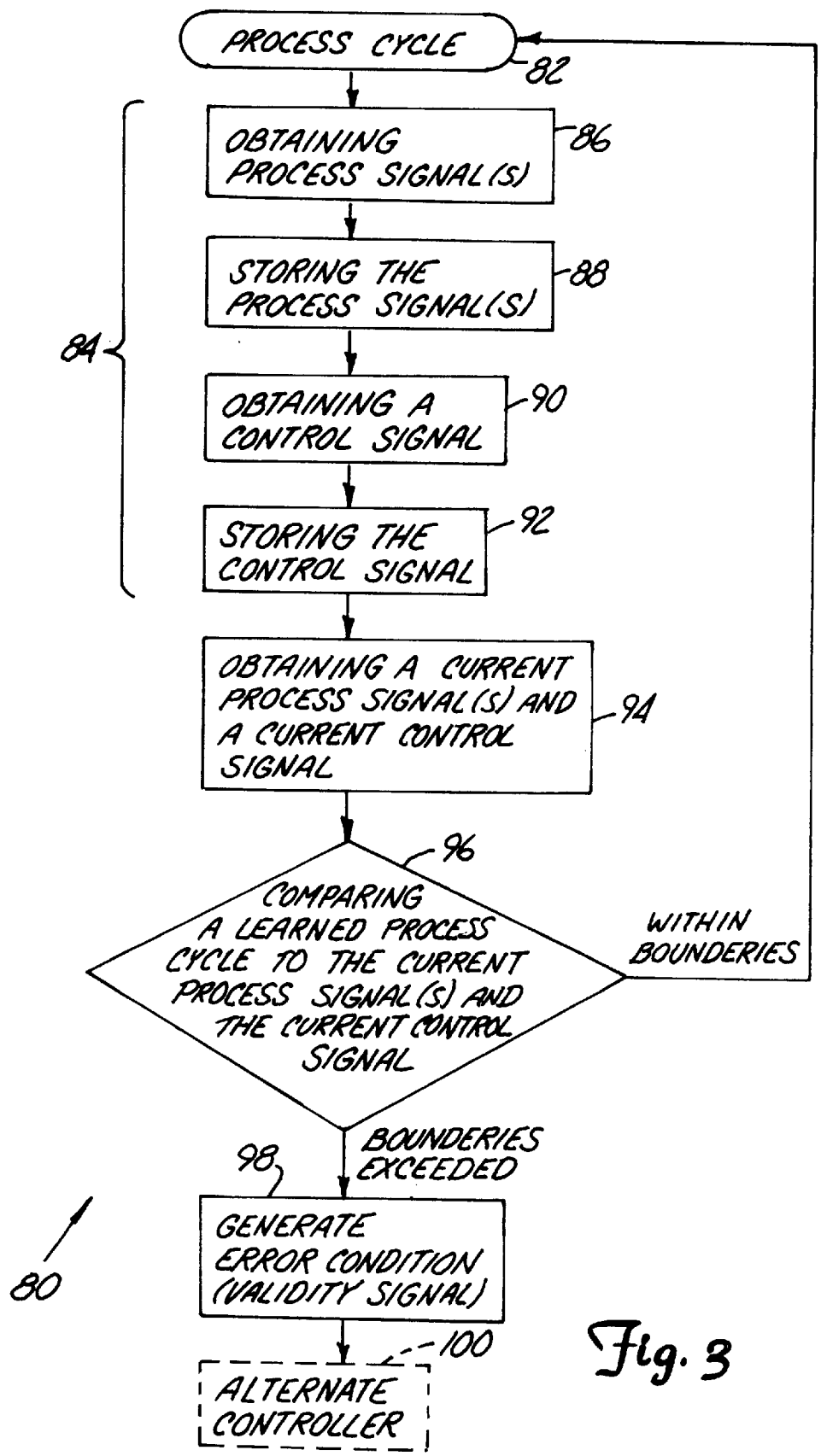
FIG. 3 is a simplified block diagram showing steps in accordance with the present invention.

FIG. 3 is a simplified block diagram 80 of a command validation function in accordance with the present invention performed by microprocessor 46 in response to instructions stored in memory 48 shown in FIG. 2. The function is initiated during a repeatable process cycle 82 and enters a process learning cycle 84. Process learning cycle 84 includes block 86 during which process signal(s) are obtained and stored in memory 48 at block 88. More than one process pattern may be obtained and stored in memory 48. Cycle 84 may be performed during commissioning of the process control loop or during manufacturing process (e.g., while the loop is operating). Control is then passed to block 90 in which a control signal is obtained and stored in memory 48 at block 92. At block 94, the current values of the process signal(s) and control signal are obtained. Block 96 is a comparison function in which process cycles which were learned during learning cycle 84 are compared to the current process signal(s) and the current control signal. If the current control signal is within boundaries determined based upon the learned process cycle, control is returned to block 82. On the other hand, if the control signal has exceeded the predetermined boundaries, control is passed to block 98 and an error condition is initiated. This error condition is also referred to herein as the validity signal which is generated by microprocessor 46. The validity signal may trigger an error event which is signalled across loop 6 or initiate a special control condition such as an emergency shut down. Furthermore, control is optionally passed to block 100 in which an alternate controller is used to generate the control signal and control the process in real time.

Figure 4A:
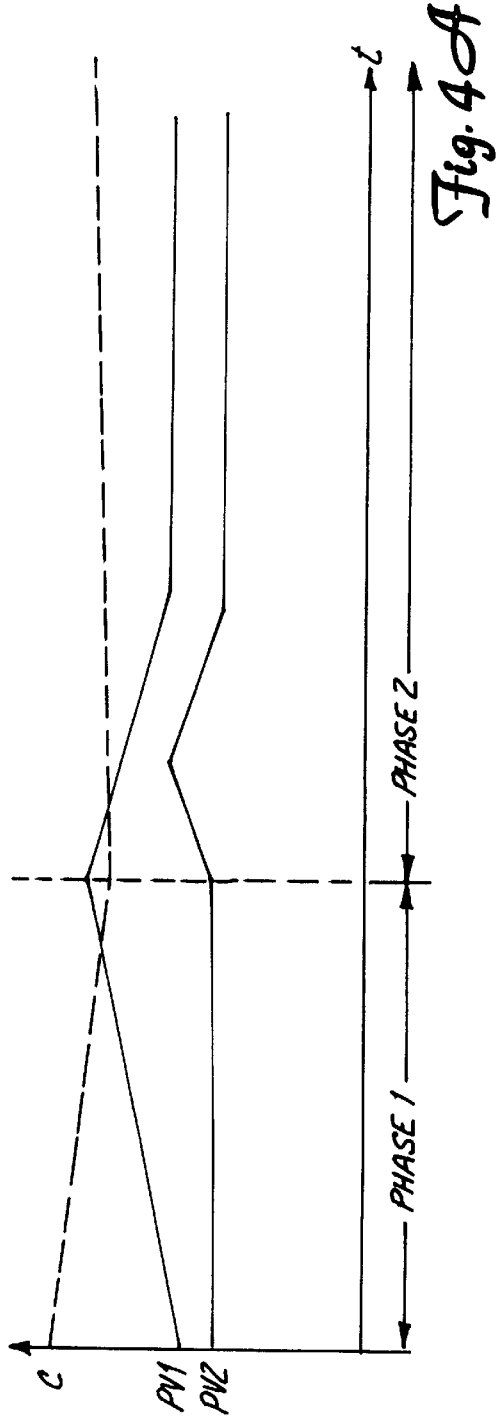
FIG. 4A shows a learning cycle.
Figure 4B:
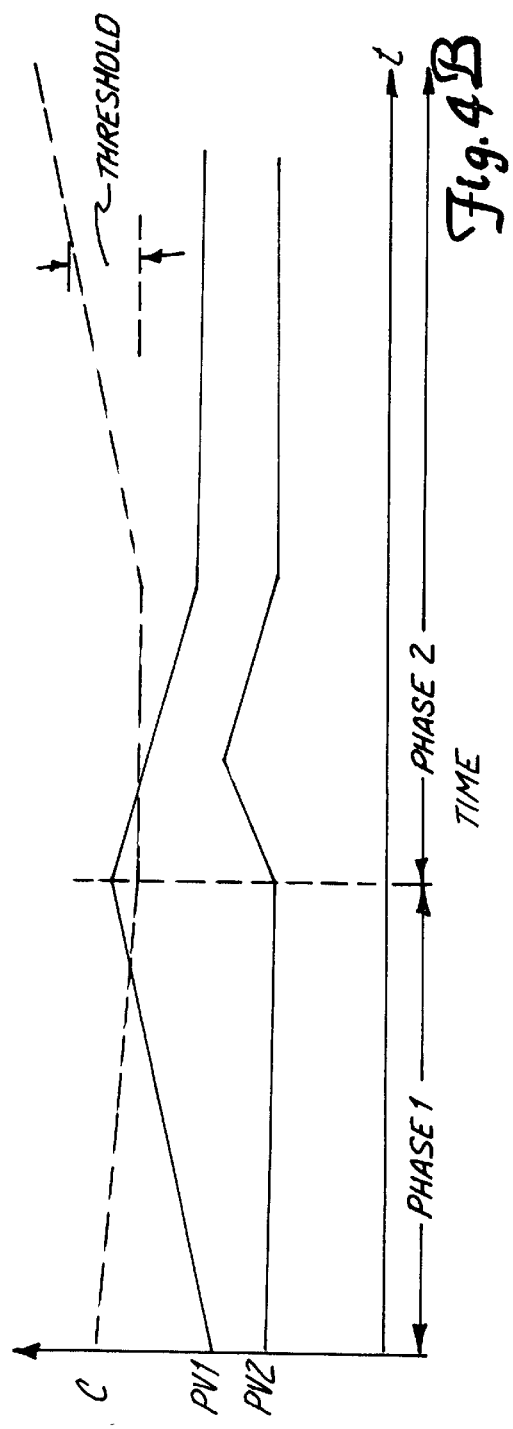
FIG. 4B shows an operation cycle for two process variables and a control signal.

FIGS. 4A and 4B show a control signal C and two process variable signals PV1 and PV2, each plotted versus time, so as to illustrate operation of block diagram 80 of FIG. 3. PV1 and PV2 may be any of the process variables available in the control system. FIG. 4A shows the process cycle during the learning cycle 84 in which process variables PV1 and PV2 and control signal C are monitored and stored in memory 48. In this example, the process cycle is divided into phases, Phase 1 and Phase 2. For each phase, information regarding the two process variables is collected and stored such that it will be possible to subsequently identify in which phase the process is currently operating. For example, such information would be the minimum, maximum and rate of change values for PV1 and PV2 may be stored along with the minimum, maximum and rate of change for the control signal C for each phase. If there is sufficient memory, data points for the entire phase may be stored.

FIG. 4B shows a process cycle after the learning period during which time the control signal C experiences an error and illustrates operation of comparison block 96 in FIG. 3. First, PV1 and PV2 are monitored to determine "where" in the cycle the process is currently operating, for example, Phase 1 or Phase 2. Then, using a rule based system as an example, if the control signal and the rate of change of the control signal are outside of predetermined percentages of the (learned) stored values, an error is generated. This is shown in Phase 2 of FIG. 4B in which the control signal, C, exceeds a predetermined percentage (THRESHOLD). The predetermined percentage is set, for example, during commissioning and stored in memory 48. Microprocessor 48 generates the validity signal error condition shown at block 98 in FIG. 3.

The learning cycle of the present invention can occur over a single process cycle or may be based upon the observance of a number of cycles. Further, the learned values may be selectively updated during subsequent process cycles. The comparison function may be through any appropriate technique including fuzzy logic algorithms, neural networks regression algorithms, other more complex rule based systems, etc. Models for different processes, including thresholds for rule sets, may be stored in memory 48 and selected and optionally optimized over a number of process cycles by a user.

Although the present invention has been described with reference to preferred embodiments, workers skilled in the art will recognize that changes may be made in form and detail without departing from the spirit and scope of the invention. For example, all of the various functions and circuitry described herein can be implemented in any appropriate circuitry including software, ASICs, fuzzy logic techniques, or even analog implementations. Further, the process device may include any number or combination of input and control channels and may operate on any number of process signals, alone or in their combination.

What is claimed is:

1. A method for validating a control output from a field device in a process, the method comprising:

learning a cycle of the process to provide a learned process information, the learned process information comprising stored process variables and stored control outputs over a specified time period;

measuring a current process variable in the process and calculating the current control output for the process as a function of the current process variable to provide current process information; and comparing the current process information to the learned process information in a validation circuit and providing a validity signal, the validity signal indicating that the current control output has exceeded a predetermined boundary derived from the learned process information.

2. The method of claim 1 wherein the steps are performed in the field device.

3. The method of claim 1 wherein the process variable is measured at a first location and the control output is calculated at a second location and the comparing is performed at the second location.

4. The method of claim 1 wherein process variable measured in a first location, the control output calculated at a second location and the comparing is performed at a third location.

5. The method of claim 1 wherein the learned process information is modeled in a fuzzy logic algorithm.

6. The method of claim 1 wherein the learned process information is modeled by a neural network.

7. The method of claim 1 wherein the learned process information is modeled by a regression algorithm.

8. A two-wire device of the type used in the process control industry, comprising:

a process variable input receiving a process variable;

a control circuit for calculating a control output as a function of the sensed process variable and the setpoint;

a memory for storing a series of sensed process variables and command outputs representative of a learned process cycle;

an output circuit for formatting the control output onto the two wires; and a validation circuit which compares the learned process cycle to the sensed process variable and command output to responsively provide a validation signal representative of a state of the control system, the validation signal indicating that the current control output has exceeded a predetermined boundary derived from the learned process information.

9. The device of claim 8 including a compensation circuit compensating the process variable.

10. The device of claim 8 wherein the learned process cycle is modeled in a fuzzy logic algorithm.

11. The device of claim 8 wherein the learned process cycle is modeled by a neural network.

12. The device of claim 8 wherein the learned process cycle is modeled by a regression algorithm.

13. The device of claim 8 wherein the process variable input comprises a sensor for sensing a process variable.

14. The device of claim 8 wherein the device is wholly powered through the two-wire loop.

15. The device of claim 8 wherein the device comprises a transmitter.

\* \* \* \* \*